B. SMITH.
Cotton-Seed Planter.
No. 78,614.
Patented June 2, 1868.
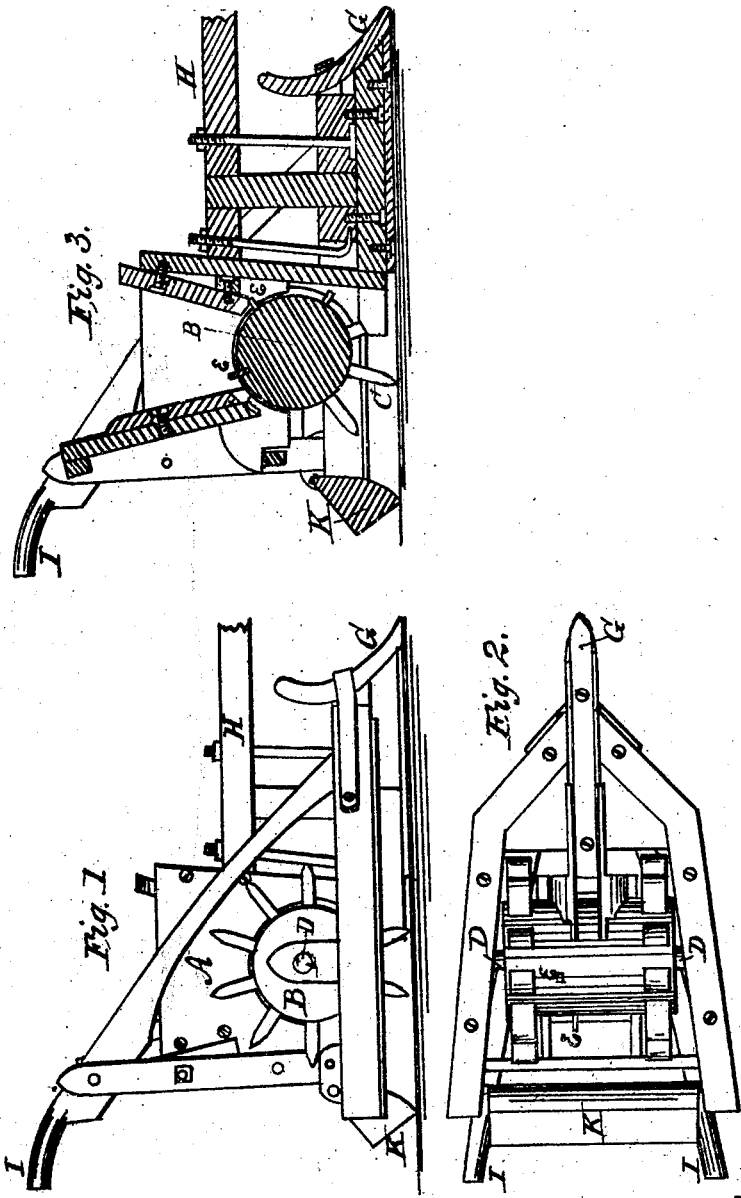
Witnesses:
J. C. Smith
A. S. Beughman
Inventor:
Bryan Smith
Chipman, Hosmer & Co.

United States Patent Office.

BRYAN SMITH, OF FALKLAND, NORTH CAROLINA.

Letters Patent No. 78,614, dated June 2, 1868.

---

IMPROVEMENT IN COTTON-SEED PLANTER.

---

The Schedule referred to in these Letters Patent and making part of the same.

---

TO WHOM IT MAY CONCERN:

Be it known that I, BRYAN SMITH, of Falkland, in the county of Pitt, and State of North Carolina, have invented a new and valuable Improvement in Cotton-Seed Planters; and I do hereby declare that the following is a full, clear, and exact description of the construction and operation of the same, reference being had to the annexed drawings, making a part of this specification, and to the letters and figures of reference marked thereon.

The object of my invention is to provide better means than have heretofore been known or used for planting cotton-seed by animal-power with accuracy and speed, thereby saving the laborious and tardy process of planting such seed by hand.

Figure 1, of the drawings, is a side view of my cotton-planter.

Figure 2 is an inverted plan view, and

Figure 3 is a longitudinal section thereof.

Letter A represents a hopper, in which the cotton-seeds are placed for planting. The front and rear sides of this hopper, at the lower ends thereof respectively, are slotted, to allow space for the action of the pins, E, hereinafter mentioned.

Letter B is a cylinder, with a series of sharp-pointed arms on each end thereof, represented by C. It is made to rotate on its axis, D, by the operation of the arms C, which mesh with the earth as the planter moves forward. This cylinder is also provided with a series of small pins, adjusted at suitable distances from each other on its periphery. These pins are marked E on the drawings. As the cylinder revolves, these pins respectively pass through the slats in the hopper, and carry with them the cotton-seeds to the ground.

Letter G is a plough, letter H is the plough-beam, and letter I the handles thereof.

Letter K is a coverer, pivoted on each side of the planter-frame, in the manner shown in the drawings. Its office is to aid in smoothing the surface of the ground, and also to cover up the seeds dropped by the pins E.

It will readily be discovered, from the shape of the bottom of my planter, as shown on fig. 2, that, by the united action of said bottom and said coverer, the furrow left by the plough must become thoroughly smoothed down, leaving a small trench in the centre, of loosely-packed earth, in desirable form for drainage purposes.

The operation of my device is easily understood from the description above given, except that, in the movements of the pins E, it must be borne in mind that it is designed to operate principally upon cotton-seeds as they are taken from the boll, with the beard removed therefrom.

What I claim as my invention, and desire to secure by Letters Patent, is—

1. The cylinder B, constructed with arms C and pins E, substantially as and for the purposes set forth.

2. In combination with cylinder B, the coverer K, constructed and operating substantially as specified.

3. A cotton-planter, having cylinder B, coverer K, and plough G, constructed and operating substantially as and for the purposes described.

BRYAN SMITH.

Witnesses:
D. W. HOOD,
ALLEN WARREN,